United States Patent Office 3,183,259
Patented May 11, 1965

3,183,259
5-CYANO-10,11-DIHYDRO-5H-DIBENZO[a,d] CYCLOHEPTENE DERIVATIVES
Cornelis van der Stelt, Haarlem, Netherlands, assignor to N.V. Koninklijke Pharmaceutische Fabrieken V/H Brocades Stheeman en Pharmacia, Amsterdam, Netherlands, a corporation of Dutch law
No Drawing. Filed Apr. 18, 1962, Ser. No. 188,569
Claims priority, application Great Britain, Apr. 27, 1961, 15,356/61
5 Claims. (Cl. 260—465)

This invention relates to new basically substituted 10,11-dihydrodibenzocycloheptenes (and their salts) having valuable therapeutic properties, processes for the preparation thereof and new intermediates useful in such processes.

The therapeuticallly active compounds of this invention include dihydrodibenzocycloheptenes of the general Formula I:

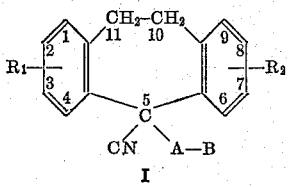

I wherein $R_1$ and $R_2$ are the same or different and represent hydrogen, halogen or lower alkyl, A is a lower alkylene radical of at least two carbon atoms, B is a basic saturated nitrogen containing radical of less than 12 carbon atoms; and salts thereof. Among the suitable radicals represented by the symbol B are amino; (lower alkyl) amino; di(lower alkyl) amino; and basic saturated 5 to 6 membered N-heterocyclic radicals of less than twelve carbon atoms, as exemplified by piperidyl, pyrrolidyl, morpholinyl, thiamorpholinyl and piperazinyl.

The terms "lower alkyl" and "lower alkylene" as employed herein, include both straight and branched chain radicals of less than 8 carbon atoms. The particularly preferred compounds are those wherein A is a lower alkylene radical of two to three carbon atoms (i.e., ethylene, trimethylene-1,3, and propylene-1,2); B represents a di(lower alkyl) amino radical, $R_1$ is in the 3-position and represents hydrogen, chloro or methyl and $R_2$ is hydrogen.

As to the salts of the dihydrodibenzocycloheptenes, those coming within the purview of this invention include the acid-addition salts, particularly the non-toxic acid-addition salts. Acids useful for preparing the acid-addition salts include, inter alia, inorganic acids, such as the hydrohalic acids (e.g., hydrochloric and hydrobromic acid), and organic acids such as oxalic, tartaric, citric and acetic acid.

The compounds of this invention are therapeutically active compounds which are utilizable as analgesics.

They may be administered orally or parenterally in conventional dosage forms such as tablets, capsules, injectables or the like by incorporating the appropriate dose of the compound with carriers according to accepted pharmaceutical practice.

The compounds of this invention can be prepared by one of the processes of this invention employing as the starting material a 5-cyano-10,11-dihydro-5H-dibenzo[a, d]cycloheptene of the general Formula II:

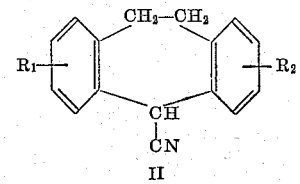

II wherein $R_1$ and $R_2$ are as hereinbefore defined.

The preparation of the initial cyanide is described in detail in my copending application, Serial No. 188,561, filed on even date herewith, now abandoned. These cyanide compounds are prepared from the corresponding alcohols by first converting the alcohols to halogenides (as more fully described in my application, Serial No. 188,560, now U.S. Patent No. 3,167,541, filed on even date herewith) and then treating the halogenides with a metal cyanide, such as cuprous cyanide, to yield the corresponding cyanides.

To prepare the compounds of the invention, the cyanide, solved in an inert medium such as toluene, xylene and the like, is first reacted with an alkali metal or with an alkyl alkali metal compound, such as butyllithium, in order to replace the loosely bounded hydrogen atom at $C_5$ and the resulting compound is then interacted with a basically substituted alkyl halide (preferably chloride) of the formula: B—A halide, the reaction preferably being conducted in the same solvent as used in the former reaction step.

The same compounds can alternatively be prepared by interacting a cyanide of the general Formula II directly with a basically substituted alkyl halide (preferably chloride) of the formula B—A halide, the reaction preferably being conducted in the presence of a basic condensation reagent such as sodamide or sodium hydroxide.

This series of reactions is shown by the following equations, wherein $R_1$, $R_2$, A and B are as hereinbefore defined; and M is a monovalent metal atom:

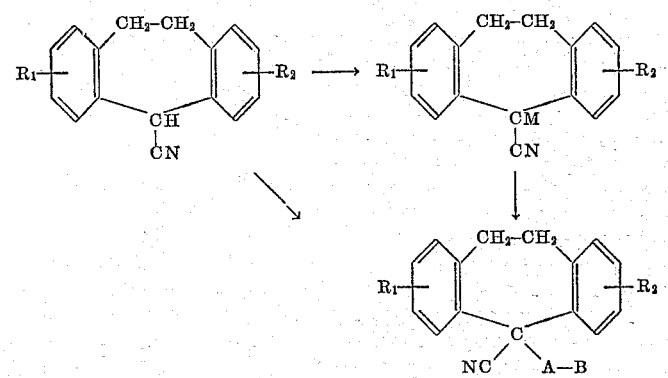

The following examples illustrate the invention (all temperatures being in centigrade).

EXAMPLE 1

[5 - (2 - dimethylaminoethyl) - 10,11-dihydro-5H-dibenzo [a,d]-cyclohepten-5-yl]cyanide. Salt with hydrochloric acid A mixture of 11 grams of (10,11-dihydro-5H-dibenzo [a,d]-cyclohepten-5-yl)cyanide, 7.5 grams of sodium hydroxide and 8.6 grams of 2-dimethylaminoethyl chloride (as its hydrochloric acid salt) is heated with stirring. A vigorous reaction takes place. Heating is continued for another half an hour. The mixture is allowed to cool. Water is then added, whereupon the mixture is extracted with ether. The ethereal solution is separated and treated with 2N hydrochloric acid. The acid layer is made alkaline and again extracted with ether. An ethereal solution of hydrochloric acid is then added to prepare the hydrochloric acid salt. 8.1 grams of the salt is obtained (52%). Recrystallization from a mixture of ethanol and ether yields the pure product melting at about 214–218°.

*Analysis.*—Calculated for $C_{20}H_{24}N_2Cl$: C, 73.48%; H, 7.10%; N, 8.58%. Found: C, 73.89%; H, 7.17%; N, 8.69%.

EXAMPLE 2

[5-(3-dimethylaminopropyl) - 10,11 - dihydro-5H-dibenzo [a,d]-cyclohepten-5-yl]cyanide. Salt with hydrochloric acid Following the procedure of Example 1 but substituting 9.5 grams of 3-dimethylaminopropyl chloride in the form of its hydrochloric acid salt for the dimethylaminoethyl chloride, 13 grams of crude salt are obtained. Recrystallization from a mixture of ethanol and ether yields the pure product melting at about 220–222°.

*Analysis.*—Calculated for $C_{21}H_{26}N_2Cl$: C, 73.98%; H, 7.39%; N, 8.22%. Found: C, 74.09%; H, 7.29%; N, 8.80%.

EXAMPLE 3

[5-(2 - dimethylaminopropyl) - 10,11 - dihydro - 5H - dibenzo[a,d]cyclohepten-5-yl]cyanide. Salt with hydrochloric acid Following the procedure of Example 1 but substituting 9.5 grams of 2-dimethylaminopropyl chloride in the form of its hydrochloric acid salt for the dimethylaminoethyl chloride, [5-(2-dimethylaminopropyl)-10,11-dihydro-5H-dibenzo[a,d]cyclohepten-5-yl]cyanide, salt with hydrochloric acid, is obtained.

EXAMPLE 4

[5 - (2 - piperidinoethyl) - 10,11 - dihydro - 5H - dibenzo [a,d]cyclohepten-5-yl]cyanide. Salt with hydrochloric acid Following the procedure of Example 1 but substituting an equivalent amount of 2-piperidinoethyl chloride hydrochloride for the dimethylaminoethyl chloride, [5-(2-piperidinoethyl)-10,11-dihydro - 5H - dibenzo[a,d]cyclohepten-5-yl]cyanide, salt with hydrochloric acid, is obtained.

Similarly, by substituting the hydrochloride salts of 3-pyrrolidinopropyl chloride and 2-piperazinoethyl chloride for the dimethylaminoethyl chloride in the procedure of Example 1, the corresponding 5-(3-pyrrolidinopropyl) and 5-(2-piperazinoethyl) derivatives are obtained, respectively. Moreover, if a substituted (10,11-dihydro-5H-dibenzo[a,d]-cyclohepten-5-yl)cyanide is substituted for the (10,11-dihydro-5H-dibenzo[a,d]cyclohepten-5-yl)cyanide in the procedure of Example 1, the correspondingly substituted product is formed. Thus, (1-chloro-10,11-dihydro - 5H - dibenzo[a,d]cyclohepten - 5 - yl)cyanide (4 - chloro - 10,11 -dihydro - 5H - dibenzo[a,d]cyclohepten-5-yl)cyanide, (3 - chloro - 10,11 - dihydro - 5H-dibenzo[a,d]cyclohepten-5-yl)cyanide, (3-methyl-10,11- dihydro - 5H - dibenzo[a,d]cyclohepten - 5 - yl)cyanide, (2 - methyl - 10,11 - dihydro - 5H - dibenzo[a,d]cyclohepten - 5 - yl)cyanide, (2,4 - dimethyl - 10,11 - dihydro-5H - dibenzo[a,d]cyclohepten - 5 - yl)cyanide, and (3-tert.butyl - 10,11 - dihydro - 5H - dibenzo[a,d]cyclohepten-5-yl)cyanide yield the correspondingly substituted 5-(2-dimethylaminoethyl) derivatives.

EXAMPLE 5

*5-chloro-10,11-dihydro-5H-dibenzo[a,d]cycloheptene*

210 grams of 10,11-dihydro-5H-dibenzo[a,d]cyclohepten-5-ol is dissolved in 1,000 ml. of anhydrous benzene. 50 ml. of freshly distilled thionyl chloride is added dropwise in a period of about 30 minutes under stirring and cooling. The temperature is maintained between 10 and 15°. After the addition of the thionyl chloride, stirring is continued for another 2 hours at the same temperature range. 125 grams of anhydrous sodium sulfate is then added and the mixture is stirred for another 2 hours. The solution is filtered, the sodium sulfate washed with portions of 50 ml. of benzene. The combined organic layers are concentrated by distillation under reduced pressure until a solid starts separating. 1,000 ml. of petroleum ether, boiling range 80–100°, is then added whereupon residual benzene is distilled off under atmospheric pressure. The distillation is discontinued when the temperature reaches about 84°. The residue is cooled and 3 g. of charcoal powder is added. The mixture is boiled under reflux for about 10 minutes and filtered; the filtrate is cooled. The crystalline material is separated by filtration and washed with small portions of petroleum ether (boiling range 80–100°). 181.5 grams (79.4%) of a white, pure crystalline is obtained, melting at 105–107°.

EXAMPLE 6

*(10,11-dihydro-5H-dibenzo[a,d]cyclohepten-5-yl)cyanide*

28 grams of 5-chloro-10,11-dihydro-5H-dibenzo[a,d]-cycloheptene is mixed with 11.7 grams of cuprous cyanide. The temperature is slowly raised to 180°. At about this temperature the reaction starts. The temperature is allowed to rise to about 210° and is kept at about that range for 15 minutes. The mixture is then cooled and a separation between organic and inorganic reaction products is brought about by addition of benzene.

The undissolved products of inorganic nature are filtered off and washed with ether. The organic layers are combined and concentrated by distillation of the solvents. The residue is made crystalline by addition of petroleum ether (boiling range 80–100°). The solid which crystallizes is filtered to yield about 19 grams of product. Recrystallization from petroleum ether gives 18 grams (68%) of the pure product constant melting at 88–90°.

*Analysis.*—Calc'd. for $C_{16}H_{13}N$: C, 87.62%; H, 5.97%; N, 6.39%. Found: C, 86.95%; H, 6.03%; N, 6.80%.

The invention includes within its scope pharmaceutical preparations comprising one or more of the therapeutically active compounds of the invention in association with a pharmacologically acceptable carrier.

What is claimed is:
1. A compound selected from the group consisting of bases of the general formula

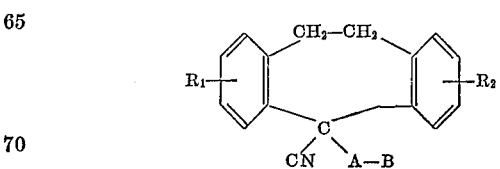

wherein A is a lower alkylene radical of at least two carbon atoms, B is selected from the group consisting of amino, (lower alkyl)amino, di(lower alkyl)amino and basic saturated 5 to 6 membered N-heterocyclic groups of less than twelve carbon atoms, and $R_1$ and $R_2$ are each selected from the group consisting of hydrogen, chloro and lower alkyl; and non-toxic acid-addition salts thereof.

2. [5 - (2 - dimethylaminoethyl) - 10,11 - dihydro - 5H-dibenzoyl[a,d]cyclohepten-5-yl]cyanide.

3. The hydrochloric acid salt of [5-(2-dimethylaminoethyl) - 10,11 - dihydro - 5H - dibenzo[a,d]cyclohepten-5-yl]cyanide.

4. [5 - (3 - dimethylaminopropyl) - 10,11 - dihydro-5-H-dibenzo[a,d]cyclohepten-5-yl]cyanide.

5. The hydrochloric acid salt of [5-(3-dimethylaminopropyl) - 10,11 - dihydro - 5H - dibenzo[a,d]cyclohepten-5-yl]cyanide.

References Cited by the Examiner

UNITED STATES PATENTS

| | | | |
|---|---|---|---|
| 2,894,033 | 7/59 | Janssen et al. | 260—567.6 |
| 2,956,063 | 10/60 | Baltzly et al. | 260—335 |
| 3,073,847 | 1/63 | Doebel et al. | 260—328 |

FOREIGN PATENTS

| | | |
|---|---|---|
| 587,479 | 8/60 | Belgium. |
| 1,109,166 | 6/61 | Germany. |

OTHER REFERENCES

Horning et al.: Organic Syntheses, Wiley and Sons, Inc., 1955, Coll. volume III, page 219.

CHARLES B. PARKER, *Primary Examiner.*